US009031158B2

(12) United States Patent
Gudem et al.

(10) Patent No.: US 9,031,158 B2
(45) Date of Patent: May 12, 2015

(54) TRANSMIT DIVERSITY ARCHITECTURE WITH OPTIMIZED POWER CONSUMPTION AND AREA FOR UMTS AND LTE SYSTEMS

(71) Applicant: QUALCOMM Incorporated, San Diego, CA (US)

(72) Inventors: Prasad Srinivasa Siva Gudem, San Diego, CA (US); Vijay K Chellappa, San Diego, CA (US); Jeremy Darren Dunworth, San Diego, CA (US); Chiewcharn Narathong, Laguna Niguel, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 13/646,876

(22) Filed: Oct. 8, 2012

(65) Prior Publication Data

US 2014/0098906 A1    Apr. 10, 2014

(51) Int. Cl.
*H04L 25/49*    (2006.01)
*H04B 1/04*    (2006.01)
*H04B 7/02*    (2006.01)
*H04B 1/00*    (2006.01)
*H04W 52/02*    (2009.01)

(52) U.S. Cl.
CPC ............... *H04B 1/0483* (2013.01); *H04B 7/02* (2013.01); *H04B 1/005* (2013.01); *H04B 1/406* (2013.01); *H04W 52/0209* (2013.01)

(58) Field of Classification Search
USPC .................................................. 375/267, 297
See application file for complete search history.

(56) References Cited

U.S. PATENT DOCUMENTS

| 2004/0043750 | A1  | 3/2004  | Kim |
| 2008/0136554 | A1  | 6/2008  | He et al. |
| 2010/0099366 | A1  | 4/2010  | Sugar et al. |
| 2010/0136935 | A1  | 6/2010  | Plevridis |
| 2010/0291888 | A1  | 11/2010 | Hadjichristos et al. |
| 2011/0116567 | A1  | 5/2011  | Van Zeijl et al. |
| 2011/0275340 | A1  | 11/2011 | Kawabe et al. |
| 2011/0286347 | A1  | 11/2011 | Mohanty et al. |
| 2012/0021697 | A1  | 1/2012  | Yang |
| 2013/0109325 | A1* | 5/2013  | Afsahi et al. .................... 455/73 |

OTHER PUBLICATIONS

International Search Report and Written Opinion—PCT/US2013/063946—ISA/EPO—Jan. 30, 2014.

* cited by examiner

*Primary Examiner* — Michael Neff

(57) ABSTRACT

A method and apparatus for providing total power from one transmit path. The method provides the steps of: selecting a transmit path and closing a first switch, located after a digital to analog converter. A second switch between the two transmit paths is then closed in order to provide for the use of at least one low-pass filter in each transmit path. The signal is then processed through the at least one low pass filter in each transmit path. The signal is then processed through at least one mixer in each transmit path. After the mixer, the signal is then processed through at least one driver amplifier in each transmit path, and one-half of the total power is allocated to each of two transmission paths. A third switch is then closed after the at least one power amplifier in each transmit path to force the half-power from one transmit path into one output.

11 Claims, 11 Drawing Sheets

TRANSMIT DIVERSITY ARCHITECTURE WITH OPTIMIZED POWER CONSUMPTION AND AREA FOR UMTS AND LTE SYSTEMS

BACKGROUND

1. Field

The present disclosure relates generally to communication systems, and more particularly, to a transmit diversity architecture with optimized power consumption and an area for Universal Mobile Telecommunications (UMTS) and Long Term Evolution (LTE) systems.

2. Background

Wireless communication systems are widely deployed to provide various types of communication content such as voice, data, and so on. These systems may be multiple-access systems capable of supporting communications with multiple users by sharing the available system resources (e.g., bandwidth and transmit power). Examples of such multiple-access systems include code division multiple access (CDMA) systems, time division multiple access (TDMA) systems, frequency division multiple access (FDMA), 3GPP Long Term Evolution (LTE) systems, and orthogonal frequency division multiple access (OFDMA) systems, and Universal Mobile Telecommunications (UMTS) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, where $N_S \geq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. When multiple transmit antennas are used, the system can also be described as having transmit diversity.

A MIMO system may support time division duplex (TDD) and/or frequency division duplex (FDD) systems. In a TDD system, the forward and reverse link transmissions can be on the same frequency region so that the reciprocity principle allows the estimation of the forward link channel from the reverse link channel. This enables the base station to extract transmit beamforming gain on the forward link when the multiple antennas are available at the base station. In an FDD system, forward and reverse link transmissions are on different frequency regions.

Modern cellular phones support multiple carriers and modes of operation. Increasingly, mobile devices are using MIMO systems to provide improved wireless communication performance. While mobile devices often utilize the latest advances in technology, there remains a need to provide legacy services. Frequently, a mobile device must be capable of transmit diversity while still operating in a legacy mode when necessary. Providing such capabilities often requires an increase in silicon area to provide the added features and modes of operation.

In the past, multiple transmit chains for MIMO or transmit diversity for cellular communications may have been implemented using multiple transmit chips. However, this is an inefficient use of silicon area and power and requires duplicate synthesizers for the two transmit chips. Duplicate transmit chains could have been implemented on the same chip, thus saving a synthesizer, but this causes the chip area to grow dramatically, which makes the chip unsuitable for products which only support the legacy mode, and causes high power consumption in the MIMO or transmitter diversity mode. There is a need in the art for a system architecture that provides for transmit diversity and optimized power consumption and is also suitable for use with UMTS and LTE systems. In addition, there is a need in the art for a space saving on the chip, and a need for a reduced size transmit chain.

SUMMARY

Embodiments disclosed herein provide system architectures with optimized power consumption and area for transmit diversity for use in UMTS and LTE systems. An apparatus for transmit diversity in a multiple input multiple output (MIMO) network is provided. The apparatus provides two input digital to analog converters, each accepting a data input; two transmit paths, each path comprising at least one low pass filter, at least one mixer, and at least one pre-power amplifier or driver amplifier; at least one switch connecting the two transmit paths before both digital analog converters or following both digital to analog converters and before an input to that at least one low pass filter or after the at least one low pass filter and before the at least one mixer or after the at least one mixer; and a second switch connecting the two transmit paths after a mixer and pre-power amplifier. The pre-power amplifier may also be called a driver amplifier. The switches provide a mechanism to deliver total power at a first transmit data stream transmission point.

A further embodiment provides a method for providing total power from two transmit paths. The method provides the steps of: selecting a transmit path input and selecting one of the digital to analog converters. A first switch between the two transmit paths is then closed in order to provide for the use of at least one low-pass filter in each transmit path. The signal is then processed through the at least one low pass filter in each transmit path. The signal is then processed through at least one mixer in each transmit path. After the mixer, the signal is then processed through at least one pre-power amplifier or power amplifier in each transmit path, and one-half of the total power is allocated to each of two transmission paths. A second switch is then closed after the at least one pre-power amplifier or driver amplifier in each transmit path to force the half-power from each pre-power amplifier or driver amplifier into one output.

A still further embodiment provides an apparatus for providing total power from two transmit paths. The apparatus provides means for closing a first switch between the two transmit paths to provide for the use of at least one low pass filter in each transmit path; means for processing the signal through the at least one mixer in each transmit path; means for processing the signal through the at least one pre power amplifier or driver amplifiers in each transmit path, wherein half of the total power is allocated to each transmission path; and means for closing a second switch after the at least one pre-power amplifier or driver amplifier in each transmit path to force the half-power from each transmit path into one output.

DETAILED DESCRIPTION

Figure 1:
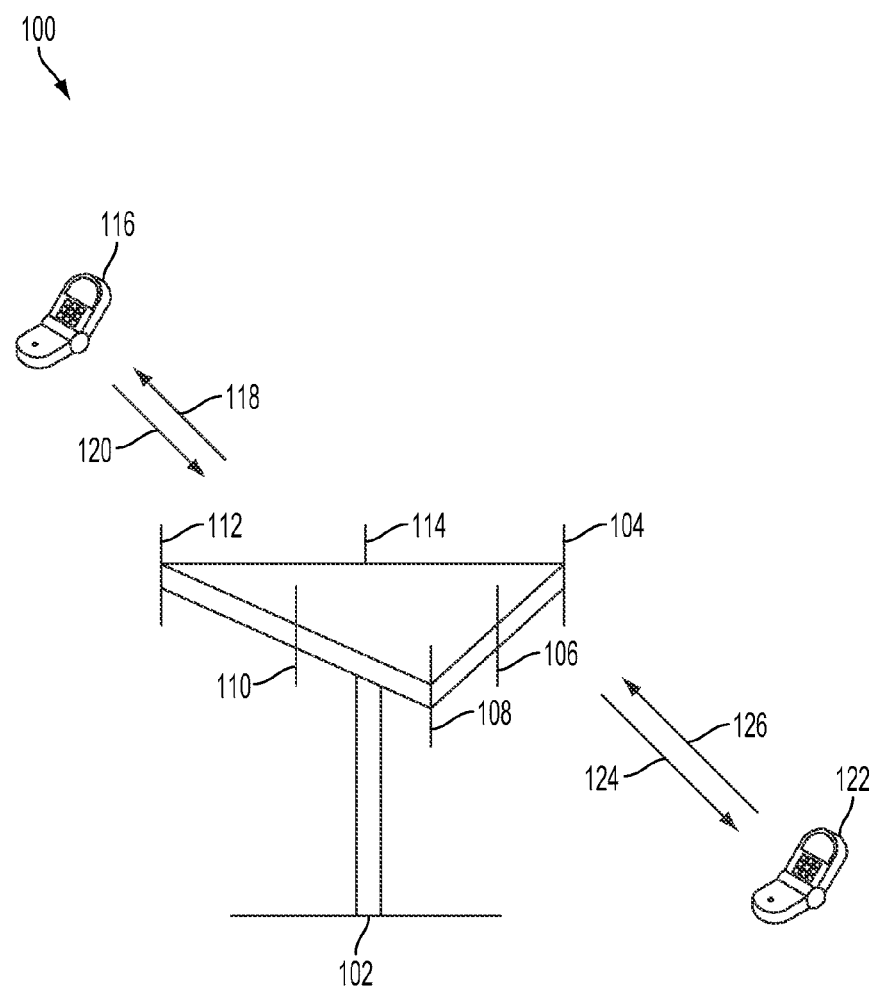
FIG. 1 illustrates a multiple access wireless communication system, in accordance with certain embodiments of the disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communication (GSM).

An OFDMA network may implement a radio technology such as Evolved UTRA (E-UTRA), the Institute of Electrical and Electronics Engineers (IEEE) 802.11, IEEE 802.16, IEEE 802.20, Flash-OFDAM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "$3^{rd}$ Generation Partnership Project" (3GPP). CDMA2000 is described in documents from an organization named "$3^{rd}$ Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various application involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-toaverage power ration (PAPR) because of its inherent single carrier structure. SC-FDMA may be used in the uplink communications where the lower PAPR greatly benefits the mobile terminal in terms of transmit power efficiency.

FIG. 1 illustrates a multiple access wireless communication system 100 according to one aspect. An access point 102 (AP) includes multiple antenna groups, one including 104 and 106, another including 108 and 110, and an additional one including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink or forward link 118 and receive information from access terminal 116 over uplink or reverse link 120. Access terminal 122 is in communication with antennas 106 and 108, where antennas 106 and 108 transmit information to access terminal 122 over downlink or forward link 124 and receive information from access terminal 122 over uplink or reverse link 126. In a Frequency Division Duplex (FDD) system, communication links 118, 120, 124, and 126 may use a different frequency for communication. For example, downlink or forward link 118 may use a different frequency than that used by uplink or reverse link 120.

Each group of antennas and/or the area in which they are designed to communicate is often referred to as a sector of the access point. In an aspect, antenna groups each are designed to communicate to access terminals in a sector of the areas covered by access point 102.

In communication over downlinks or forward links 118 and 124, the transmitting antennas of access point may utilize beamforming in order to improve the signal-to-noise ratio (SNR) of downlinks or forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology.

Figure 2:
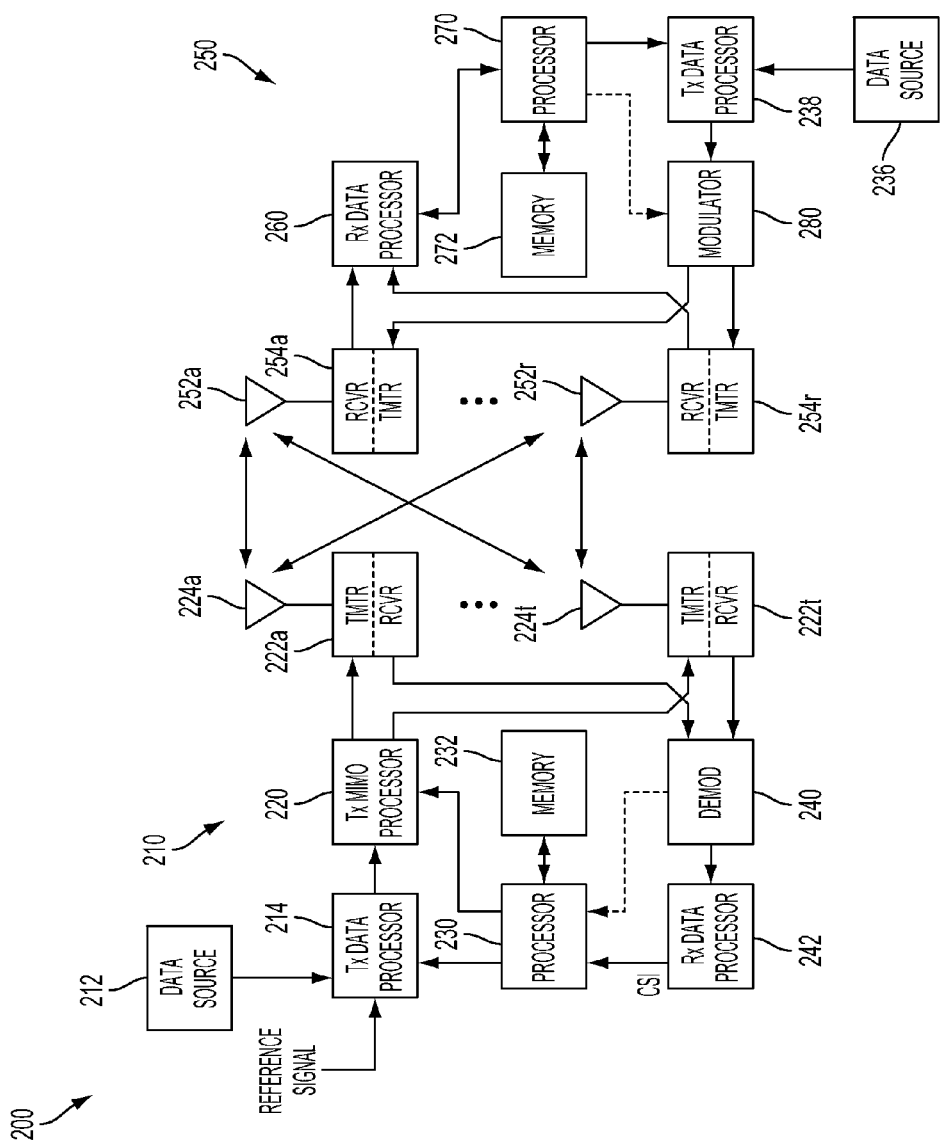
FIG. 2 illustrates a block diagram of a communication system in accordance with certain embodiments of the disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214. An embodiment of the disclosure is also applicable to a wireline (wired) equivalent of the system shown in FIG. 2.

In an aspect, each data stream is transmitted over a respective transmit antenna. TX data processor 214 formats, codes, and interleaves the traffic data for each data stream based on a particular coding scheme selected for that data stream to provided coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular based on a particular modulation scheme (e.g., a Binary Phase Shift Keying (BPSK), Quadrature Phase Shift Keying (QPSK), M-PSK in which M may be a power of two, or M-QAM, (Quadrature Amplitude Modulation)) selected for that data stream to provide modulation symbols. The data rate, coding, and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by the $N_R$ antennas 252a through 252r and the received signal from each antenna 252 is provided to a respective receiver (RCVR) 254a through 254r. each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX processor 260 is complementary to that performed by TX MIMO processor 220 and TX data processor 214 at transmitter system 210.

Processor 270, coupled to memory 272, formulates a reverse link message. The reverse link message may comprise various types of information regarding the communication link and/or the received data stream. The reverse link message is then processed by a TX data processor 238, which also receives traffic data for a number of data streams for ma data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

The embodiments described herein provide RF MIMO or transmit diversity and legacy mode operation with minimal increases in area and current consumption. Transmit diversity may encompass actual transmit diversity as well as uplink multiple input-multiple output systems (UL MIMO). The embodiments described herein lock two transmit frequencies to the same local oscillator (LO), which is critical for MIMO and transmit diversity performance. The architecture embodiments described herein apply to UL MIMO, UMTS, and LTE systems.

Generally, a wireless multiple-access communication system may simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out, or a MIMO system.

A MIMO systems employs multiple ($N_T$) transmit antennas and multiple $N_R$ receive antennas for data transmission. A MIMO channel formed by the $N_T$ transmit and $N_R$ receive antennas may be decomposed into $N_S$ independent channels, where $N_S \geq \min \{N_T, N_R\}$. Each of the $N_S$ independent channels corresponds to a dimension. The MIMO system can provide improved performance, (e.g., higher throughput and/or greater reliability) if the additional dimensionalities created by the multiple transmit and receive antennas are utilized.

A MIMO system may support time division duplex (TDD) and/or frequency division duplex (FDD) systems. In a TDD system, the forward and reverse link transmissions should be on the same frequency region so that the reciprocity principle allows the estimation of the forward link channel from the reverse link channel. This enables the base station to extract transmit beamforming gain on the forward link when the multiple antennas are available at the base station. In an FDD system, forward and reverse link transmissions are in different frequency regions.

Figure 3:
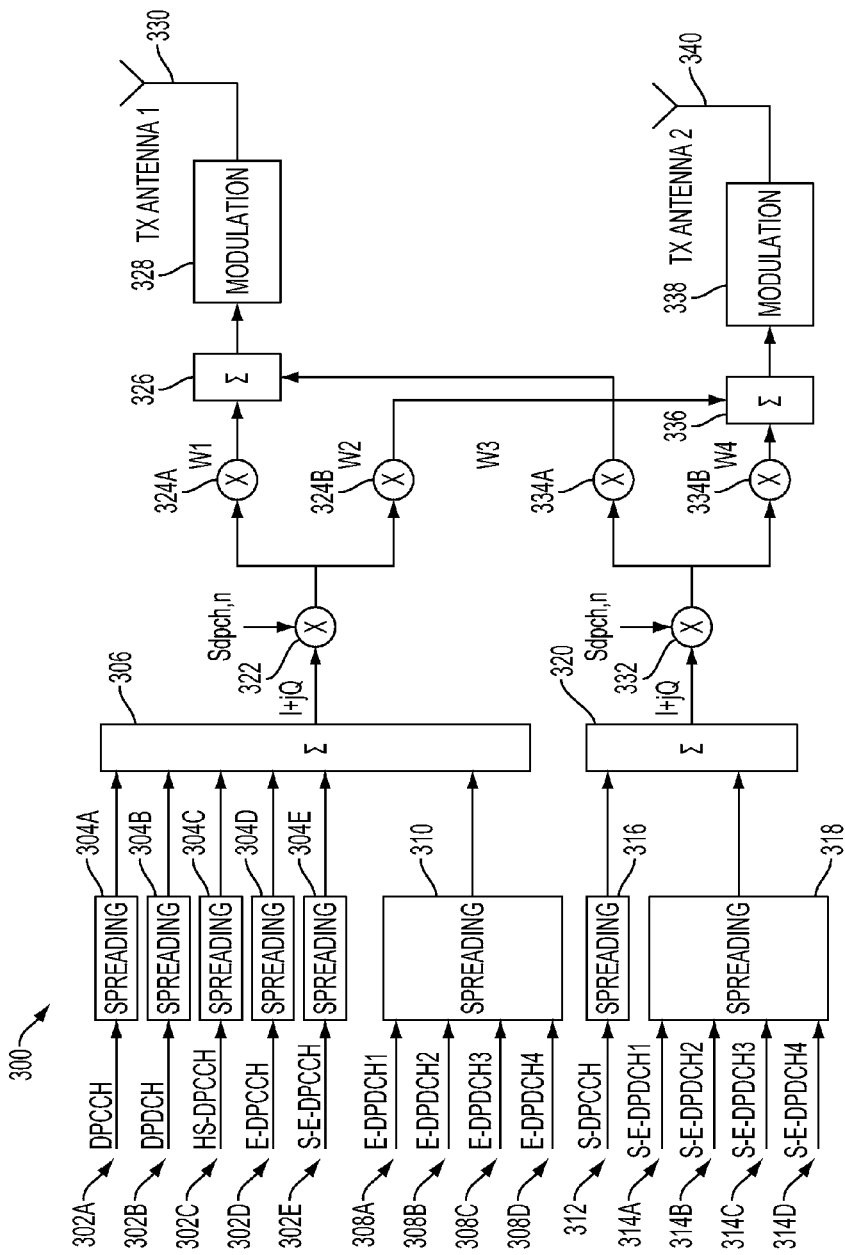
FIG. 3 illustrates a MIMO system architecture typically used in a wireless communication system.

FIG. 3 provides an overview of the architecture of a typical MIMO system. The system, 300 includes the elements discussed below. Channels 302A-E are input to respective spreading devices 304A-E. Channel 302A is the dedicated physical control channel (DPCCH) 302B is the dedicated physical control channel (DPDCH), 302C is the high speed dedicated physical control channel (HS-DPCCH), 302D is the enhanced dedicated physical data channel (E-DPCCH) 302E is the synchronization enhanced dedicated physical control channel (S-E-DPCCH). In a similar fashion, channels 308A-D are input to a second spreading device 310. Channel 308A is the enhanced dedicated physical data channel number 1, 308B is the enhanced dedicated physical data channel number 2, 308C is the enhanced dedicated physical data channel number 3, and 308D is the enhanced dedicated physical data channel number 4.

Channel 312, the synchronized dedicated physical control channel (S-DPCCH) in input to spreading device 316. Similarly, channels 314A-D are input to spreading device 318. Channel 314A is the synchronized dedicated physical data channel number 1, channel 314B is the synchronized dedicated physical data channel number 2, channel 314C is the synchronized dedicated physical data channel number 3, and 314D is the synchronized dedicated physical data channel number 4.

The summer device sums the inputs from the channels that are sent to it for processing. Each summer, 316 and 320 outputs results to a mixer. Summer 306 outputs results to mixer 322, while summer 320 outputs results to mixer 332. Each mixer takes the I+jQ products of the summer and mixes with the $S_{dpch,n}$ input to form an output product. This output product is then input to another two mixers, 324A and B in the case of mixer 322, and 334A and B in the case of mixer 332. In mixer 324 A weights w1 are applied and in mixer 324B weights w2 are applied. In mixer 334A weights w3 are applied and in mixer 334B weights w4 are applied. The products from mixer 324A are sent to summer 326. The products from mixer 324B are sent to summer 336. The products from 334A are sent to summer 326 and the products from 334B are sent to summer 336. As a result, summers 326 and 336 each receive an input from both mixers 322 and 332. Summers 326 and 336 provide inputs to the modulation functions 328 and 338. The modulation functions in turn deliver their respective outputs to antennas 330 and 340 for transmission.

The architecture of the embodiments proposed for MIMO systems uses two transmit chains. The baseband circuits may either transmit the same signal on both chains, or may transmit two different signals, one on each transmit chain. The goal is to maintain legacy device operation and to provide optimal performance. In the embodiments, there are two digital to analog converters (DAC), two data streams and one phase lock loop (PLL) and one or two local oscillator dividers. If two dividers are used, coordination between the dividers is needed when in legacy mode so that I and Q outputs of both dividers are in phase with each other. Two upconverters and two local oscillator buffers may also be used.

Figure 4:
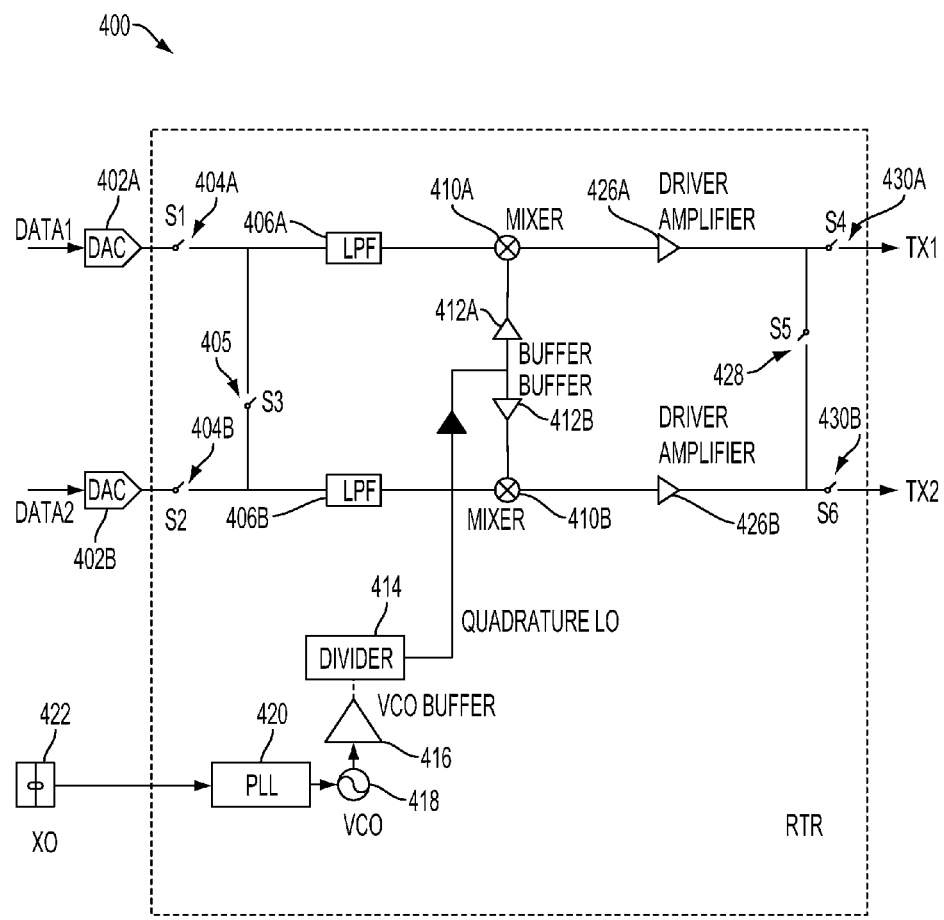
FIG. 4 illustrates a transmitter architecture that can be configured for either MIMO operation or legacy operation in accordance with an embodiment of the disclosure.

FIG. 4 illustrates a transmitter architecture that can be configured for either MIMO operation or legacy operation. In FIG. 4, in the system 400, two data inputs DATA1 and DATA2 can be provided to two digital to analog converters (DAC) 402A and 402B. Switches S1 404A, S2 404B and S3 405 allow transmit baseband signals from DAC 402A and DAC 402B to be coupled to low pass filters (LPF) 406A and 406B. Transmit baseband signals from LPF 406A and 406B are coupled to mixers 410A and 410B. Mixers 410A and 410B receive local oscillator signal from local oscillator buffers 412A and 412B and upconvert transmit baseband signals to radio frequency signals. Radio frequency signals at output of mixers 410A and 410B are coupled to driver amplifiers (DA) 426A and 426B. Switches S4 430A, S5 428, and S6 430B allow radio frequency transmit signals from DA 426A and 426B to be coupled to outputs TX1 and TX2. PLL, VCO, VCO Buffer, and Divider provide quadrature LO signals to local oscillator buffers 412A and 412B.

It should be understood that switches 404A S1 and 404B S2 can be integrated within DAC 402A and 402B, for example by providing a "open switch" mode in the DAC where the DAC output is set to a high impedance state and no signal is provided from the DAC. When the DAC 402A or 402B operates normally and outputs a signal, this is equivalent to closing switch 404A S1 or 404B S2 respectively and allowing signal from DAC 402A or 402B to be coupled to subsequent stages of transmit system 400.

Likewise, switches S4 430A and S6 430B can be integrated within driver amplifier 426A and 426B respectively, for example by use of a cascode amplifier within driver amplifier which can be enabled or disabled. Within DA 426A enabling the cascode amplifier is equivalent to closing switch S4 430A and disabling the cascode amplifier is equivalent to opening switch S4 430A. Within DA 426B enabling the cascode amplifier is equivalent to closing switch S6 430B and disabling the cascode amplifier is equivalent to opening switch S6 430B.

Figure 5:
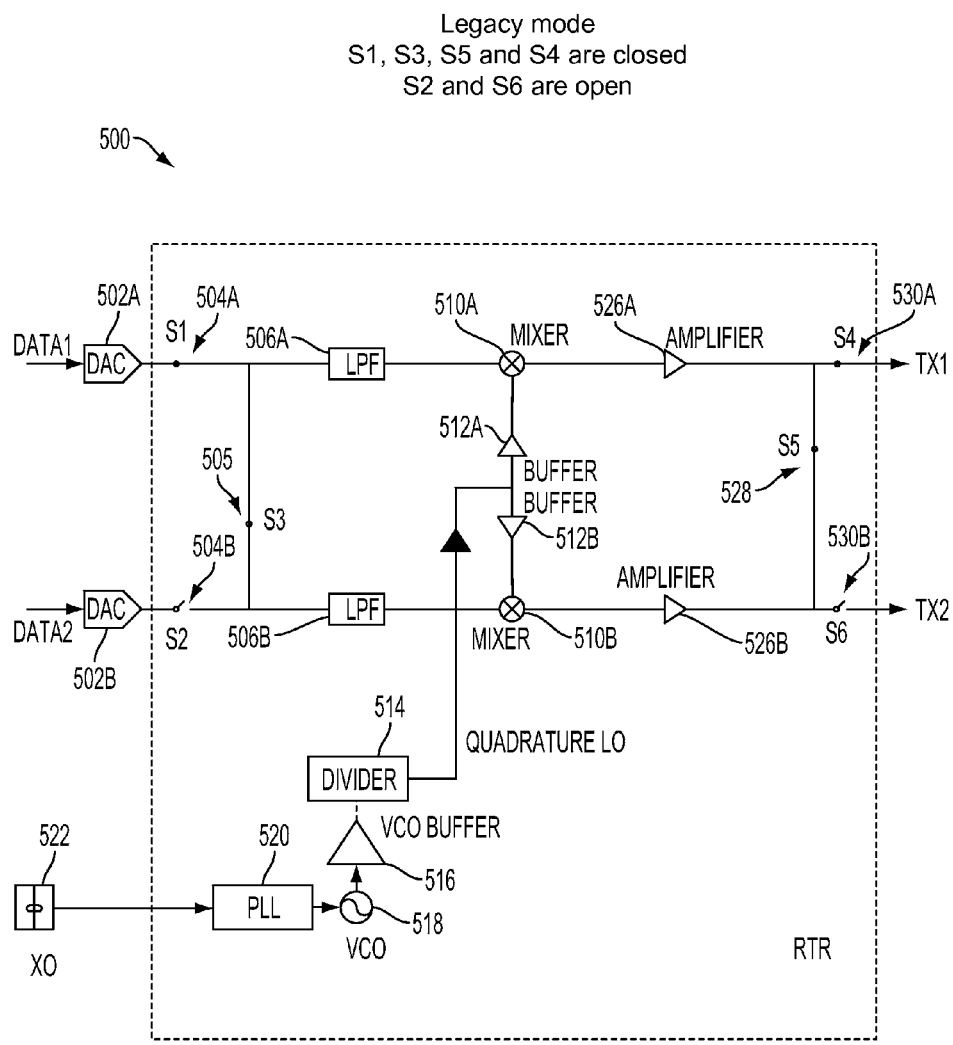
FIG. 5 illustrates an architecture of a transmit diversity architecture when configured for legacy operation in accordance with an embodiment of the disclosure.

FIG. 5 illustrates an architecture of a transmit diversity architecture when configured for legacy operation. FIG. 5 illustrates the system 500 in one possible configuration for legacy operation. Switches 504A S1 and 505 S3 are closed while switch 504B S2 is open, allowing signal DATA1 to drive DAC 502A. DAC 502B is not used in the configuration and can be disabled to save power. DAC 502A transmit baseband signal is coupled to LPF 506A and LPF 506B. LPF outputs are coupled to mixers 510A and 510B. Mixer outputs are coupled to driver amplifiers 526A and 526B. Switches 530A S4 and 528 S5 are closed while switch 530B S6 is open providing total power of radio frequency transmit signal to signal TX1. Other configurations for legacy mode are possible, as when input data is provided on DATA1 and output signal is on TX2, input data is on DATA2 and output signal is on TX1 and input data is on DATA2 and output signal is on TX2. As will be described later this document, the location of 505 S3 can also be varied.

Figure 6:
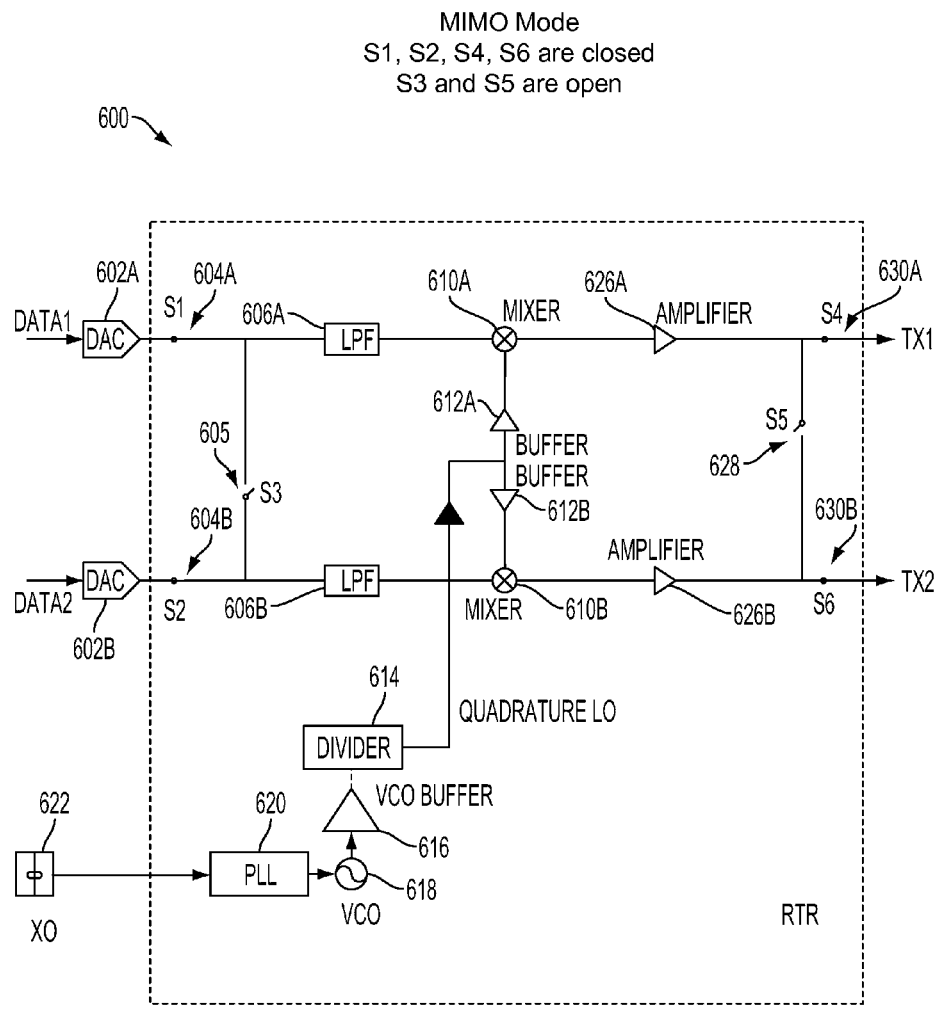
FIG. 6 illustrates an architecture of a transmit diversity architecture when configured for MIMO or transmit diversity operation in accordance with an embodiment of the disclosure.

FIG. 6 illustrates an architecture of a transmit diversity architecture when configured for MIMO or transmit diversity operation. FIG. 6 illustrates the system 600 in one possible configuration for MIMO operation. In MIMO operation different input signals are provided on DATA1 and DATA2 as previously described in FIG. 3. Switches 604A S1 and 604B S2 are closed while switch 605 S3 is open. Transmit baseband signal from DAC 602A is coupled to LPF 606A. A different transmit baseband signal from DAC 602B is coupled to LPF 606B. Transmit baseband signal output from LPF 606A is coupled to mixer 610A. A different transmit baseband signal from LPF 606B is coupled to mixer 610B. Radio frequency transmit signal from mixer 610A is coupled to driver amplifier 626A. A different radio frequency transmit signal from mixer 610B is coupled to driver amplifier 626B. Switches 630A S4 and 630B S6 are closed while switch 628 S5 is open, allowing transmit signal that originated with DATA1 stream to be coupled to output TX1 and a different transmit signal that originated with DATA2 stream to be coupled to output TX2.

Figure 7:
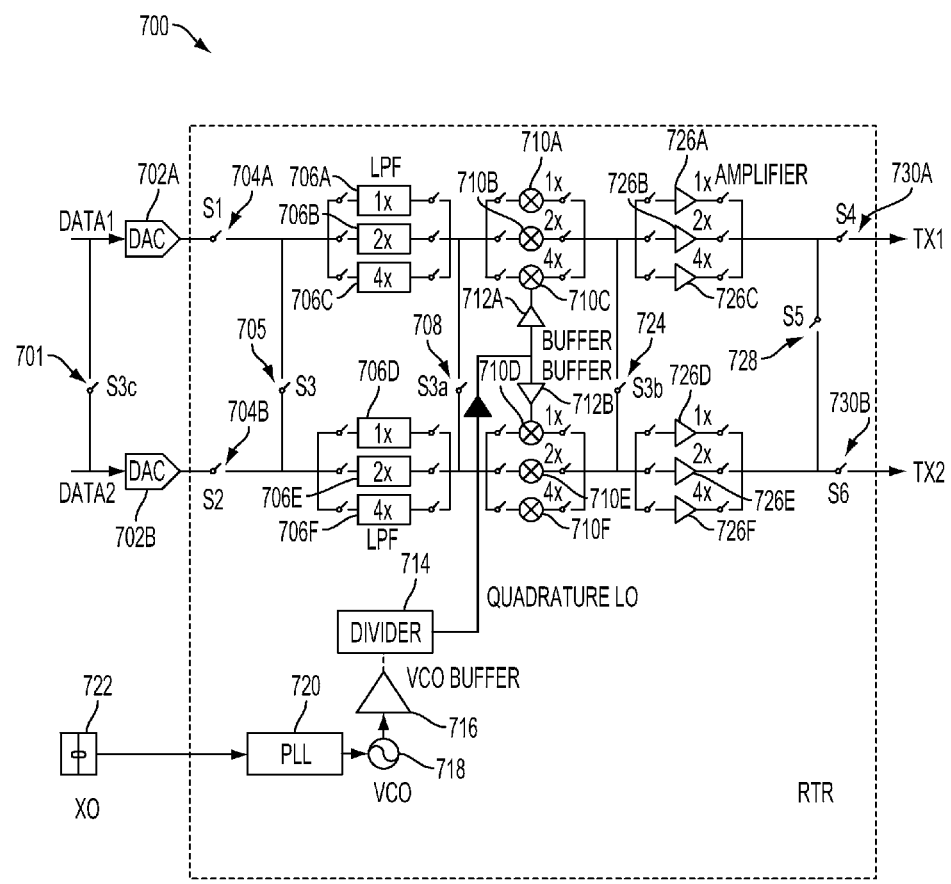
FIG. 7 illustrates an architecture of a transmit diversity architecture in accordance with an embodiment of the disclosure.

FIG. 7 illustrates an embodiment of a system architecture of a transmit diversity architecture with optimized power consumption and an area for UMTS and LTE systems with two transmit chains and the entire architecture divided into two pieces. In FIG. 7, in the system 700, Data 1 is input through a digital to analog converter (DAC) 702A and Data 2 is input through (DAC) 702B. Data 1 and Data 2 are linked by switch 701. After DAC 702A, the Data 1 passed through switch 704A, while Data 2 passes through switch 704B. These two paths are connected through switch 705. Data 1 then passes through low pass filters 706A-C, while Data 2 passes through 706D-F. After the low pass filters 706A-F, the paths are linked through switch 708. Data 1 then passes through mixers 710A-C, and Data 2 passes through mixers 710D-F. The paths are connected through buffers 712A and 712B. Divider 714 provides an input between buffers 712A and 712B. The divider 714 input originates with a crystal oscillator 722 that provides input to PLL 720. The PLL input is provided to variable oscillator 718. The VCO 718 output is sent to the VCO buffer 716 that in turn provides input to the divider 714.

The output from the mixers 710A-F is connected through switch 724. The output from the mixers 710A-F are then passed through amplifiers 726A-C for Data 1 and 726D-F for Data 2. The output between Data 1's path and Data 2's path is connected by switch 728. Each transmit path, Tx1 and Tx2 is connected to a switch, for Tx1 switch 730A and for Tx2 switch 730B and switch 728. This produces a longer path for Data 2 to traverse, which may not be desirable in some systems. In tracing the paths after the signals exit switches 704A and 704B it is apparent that Data 1 takes a straight path through switch 730A, while Data 2 must pass through switch 730A and switch 728.

The architecture in FIG. 7 provides for maximum power to be delivered at output Tx1. This is achieved by closing switch 704A, switch 705, 730A, and switch 728. Total power may also be achieved at Tx2 by adjusting the switch settings, closing switches 704A, 705, 708, and 730B. The architecture of FIG. 7 also allows for power consumption control by selecting how many low pass filters 706A-F are enabled for a given output signal strength at TX1 or TX2. Power consumption control may also be exercised by selecting how many mixers 710A-F are enabled for a given output signal strength at TX1 or TX2. Power consumption control may also be exercised by selecting how many driver amplifiers 726A-F are enabled for a given output signal strength at TX1 or TX2. In the upper signal path LPF 706A-C may have relative sizes of 1×, 2×, or 4× or any combination thereof. Mixer 710A-C may have relative sizes of 1×, 2× or 4× or any combination thereof. Driver amplifier 726A-C may have relative sizes of 1×, 2× or 4× or any combination thereof. Power consumption scaling and gain scaling by ratios of 1×, 2× and 4× is an example embodiment and other scaling ratios may be used.

Figure 8:
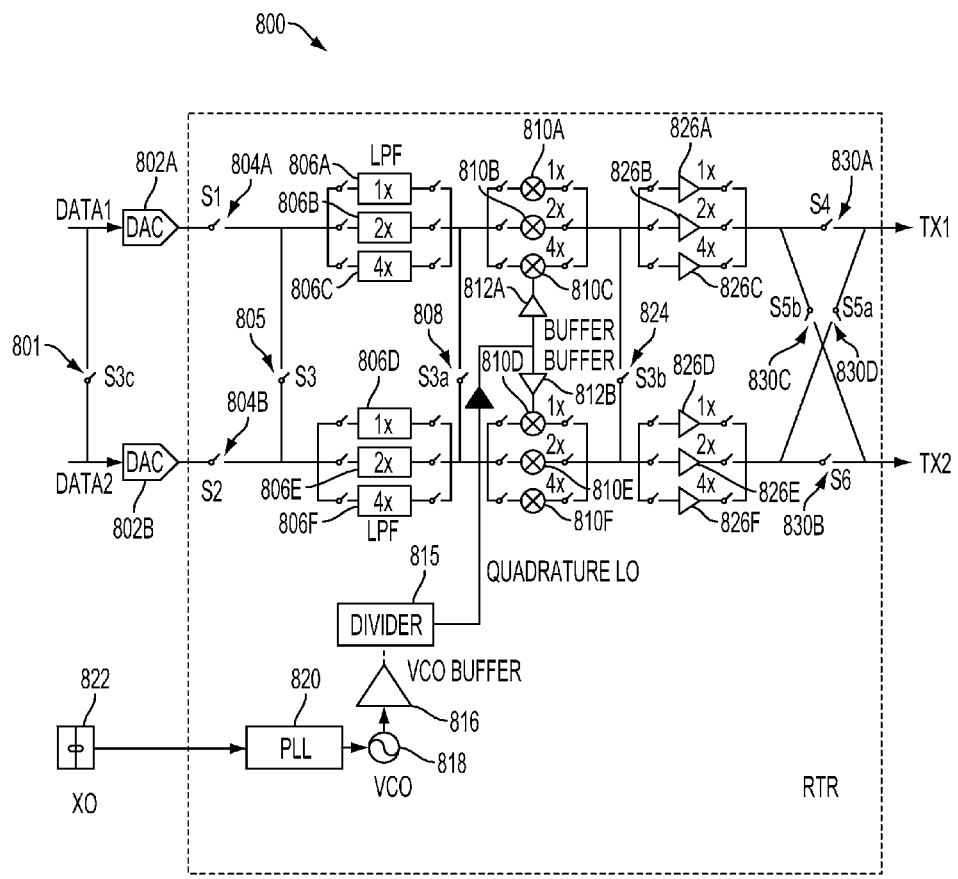
FIG. 8 illustrates a second architecture of a transmit diversity architecture in accordance with an embodiment of the disclosure.

FIG. 8 illustrates a second embodiment of a transmit architecture for uplink MIMO and transmit diversity. Two DACs, 802A and 802B are provided along with a crossed switch pathway with switches 830A, 830D, 830C, and 830B. After exiting the DACs 802A and 802B, Data 1 is passed through switch 804A, while Data 2 passes through 804B. The paths are connected to switch 805. Data 1 then passes through low pass filters 806A-C and Data 2 passes through low pass filters 806D-F. The paths are then connected through switch 808. The embodiment of FIG. 8 provides equal length paths because of the cross switch. Data 1 then passes through mixers 810A-C, and Data 2 passes through mixers 810D-F. The paths are connected through buffers 812A and 812B. Divider 814 provides an input between buffers 812A and 812B. The divider 814 input originates with a crystal oscillator 822 that provides input to PLL 820. The PLL input is provided to variable oscillator 818. The VCO 818 output is sent to the VCO buffer 816 that in turn provides input to the divider 814.

The output from the mixers 810A-F is connected through switch 824. The mixers 810A-F are then passed through amplifiers 826A-C for Data 1 and 826D-F for Data 2. Data 1 and Data 2 then passes through the crossed switches as described above.

In diversity mode operation, switches 804A and 830A are closed in the upper transmit chain and 804B and 830B are closed in the lower transmit chain. When operated in this configuration, half of the power is output at Tx1 and half at Tx2 for a balanced mode that avoids mixing products.

Figure 9:
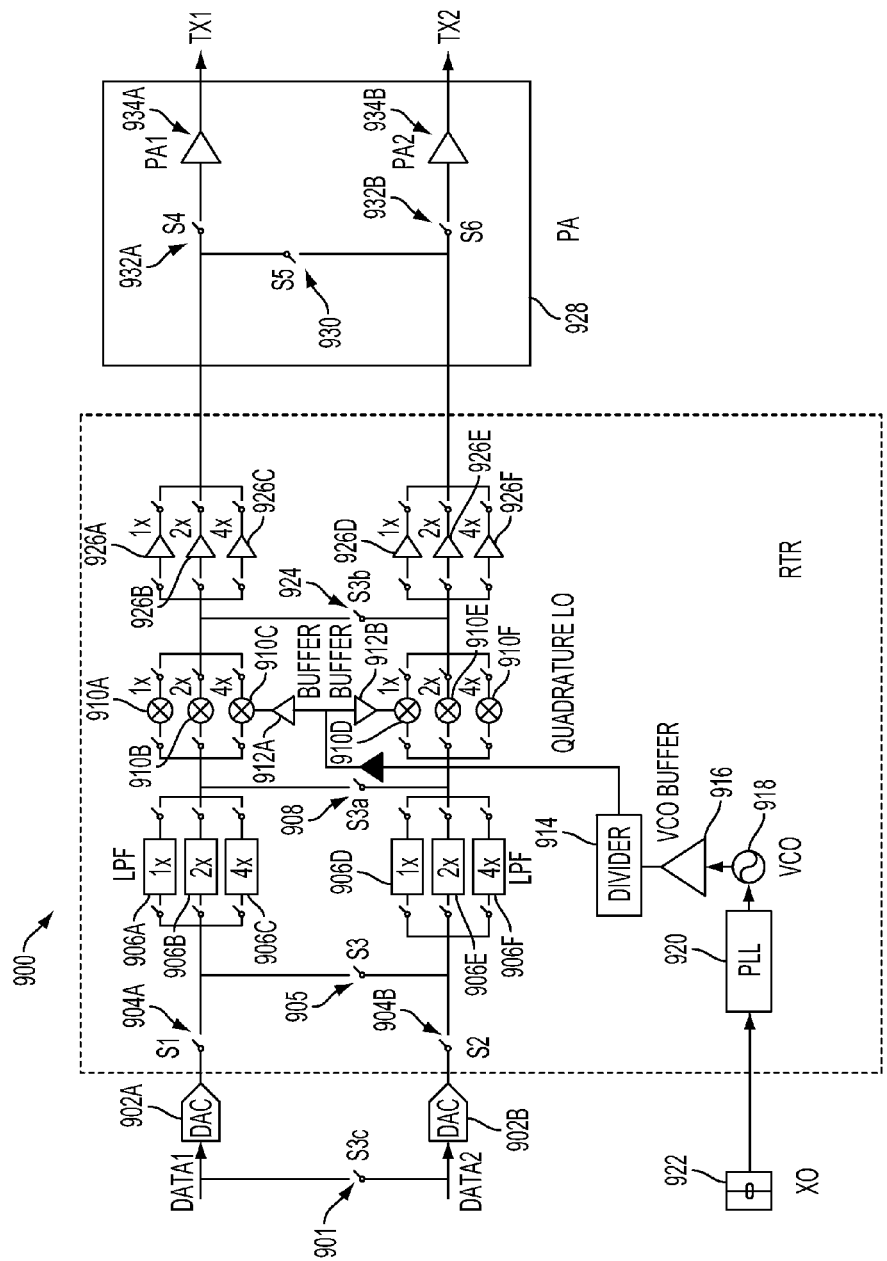
FIG. 9 illustrates a third architecture of a transmit diversity architecture in accordance with an embodiment of the disclosure.

FIG. 9 illustrates a third embodiment of a transmit architecture for uplink MIMO and transmit diversity. Two DACs, 902A and 902B are provided along with a crossed switch pathway with switches 930A, 930D, 930C, and 930B. After exiting the DACs 902A and 902B, Data 1 passed through switch 904A, while Data 2 passes through 904B. The paths are connected to switch 905. Data 1 then passes through low pass filters 906A-C and Data 2 passes through low pass filters 906D-F. The paths are then connected through switch 908. Data 1 then passes through mixers 910A-C, and Data 2 passes through mixers 910D-F. The paths are connected through buffers 912A and 912B. Divider 914 provides an input between buffers 912A and 912B. The divider 914 input originates with a crystal oscillator 922 that provides input to PLL 920. The PLL input is provided to variable oscillator 918. The VCO 918 output is sent to the VCO buffer 916 that in turn provides input to the divider 914.

The output from the mixers 910A-F is connected through switch 924. The mixers 910A-F are then passed through amplifiers 926A-C for Data 1 and 926D-F for Data 2. In this embodiment a switch is provided before power amplifier assembly 928. A switch 932A is provided before power amplifier 934A for Data 1. A switch 932B is provided before power amplifier 934B. The paths are connected by switch 930. This third embodiment provides an equal signal path.

Figure 10:
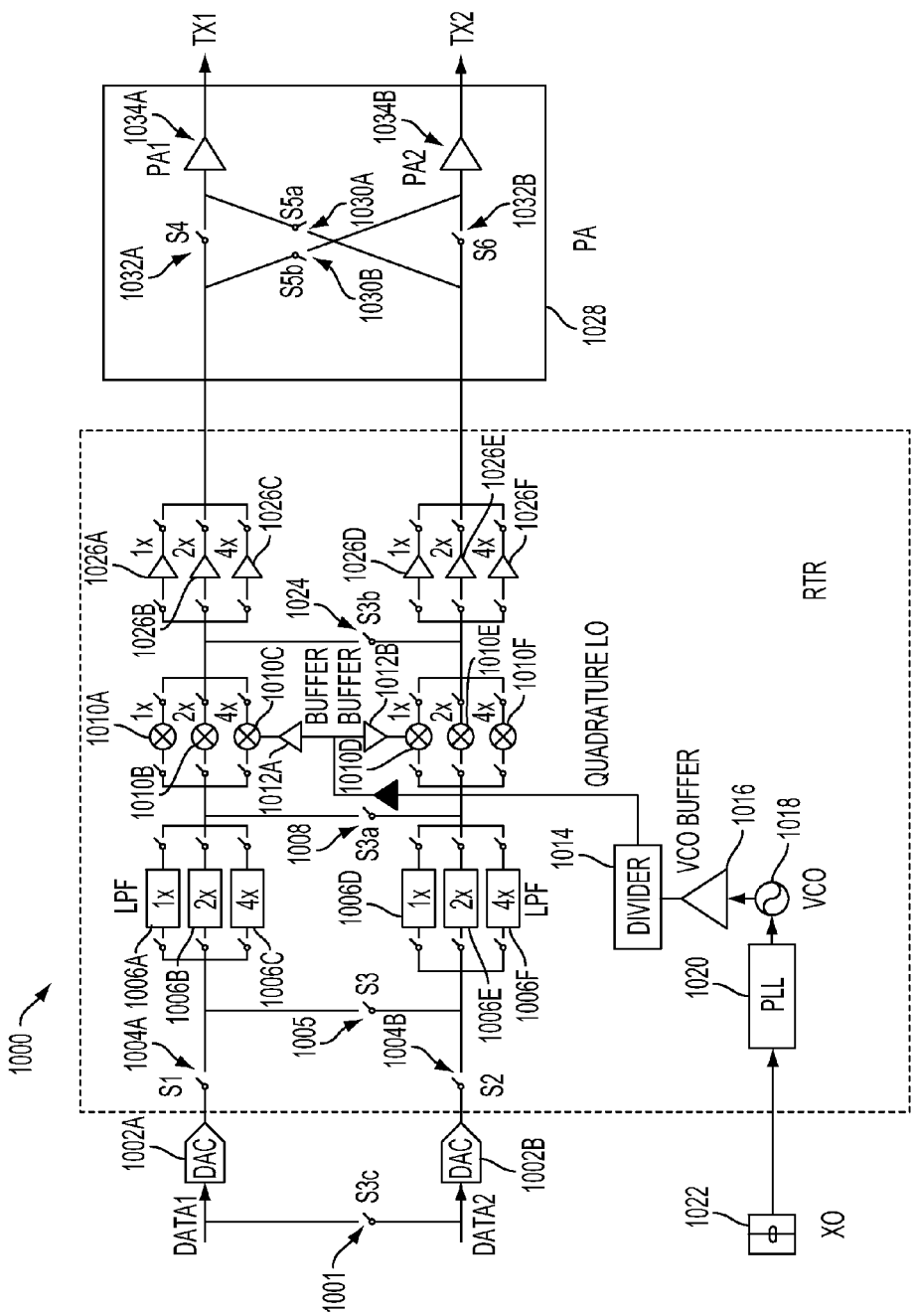
FIG. 10 illustrates a fourth architecture of a transmit diversity architecture in accordance with an embodiment of the disclosure.

FIG. 10 illustrates a third embodiment of a transmit architecture for uplink MIMO and transmit diversity. Two DACs, 1002A and 1002B are provided along with a crossed switch pathway with switches 1030A, 1030D, 1030C, and 1030B. After exiting the DACs 1002A and 1002B, Data 1 passed through switch 1004A, while Data 2 passes through 1004B. The paths are connected to switch 1005. Data 1 then passes through low pass filters 1006A-C and Data 2 passes through low pass filters 1006D-F. The paths are then connected through switch 1008. Data 1 then passes through mixers 1010A-C, and Data 2 passes through mixers 1010D-F. The paths are connected through buffers 1012A and 1012B. Divider 1014 provides an input between buffers 1012A and 1012B. The divider 1014 input originates with a crystal oscillator 1022 that provides input to PLL 1020. The PLL input is provided to variable oscillator 1018. The VCO 1018 output is sent to the VCO buffer 116 that in turn provides input to the divider 71014.

The output from the mixers 1010A-F is connected through switch 1024. The mixers 1010A-F are then passed through amplifiers 1026A-C for Data 1 and 1026D-F for Data 2. In this embodiment a switch is provided before power amplifier assembly 1028. A switch 1032A is provided before power amplifier 1034A for Data 1. A switch 1032B is provided before power amplifier 1034B. A cross switch consisting of switches 1030A and 1030B is provided. This embodiment a crossed switch is provided just before the power amplifiers 1034A and 1035B. The embodiment illustrated in FIG. 10 provides for mutually exclusive transmission paths.

In each of the embodiments depicted in FIGS. 4-10, the transmit branches Tx 1 and Tx 2 are half-sized. The signal between Paths 1 and 2 may be re-combined using switch 705, 805, 905, or 1005 (at the low pass filter input), 708, 808, 908, and 1008 (at mixer input), 724, 824, 924, and 1024 at (DA input), 701, 801, 901, and 1001 (at DAC input). This provides for maximum flexibility. While multiple switches are illustrated and may be incorporated, at a minimum only one switch needs to be implemented, one of 705, 805, 905, and 1005, 708, 808, 908, and 1008, or 701, 801, 901, and 1001 rather than 724, 824, 924, and 1024 may be selected. While the embodiment of FIG. 8 provides an extra switch, the architecture provides more balancing between the two transmit streams. Both signal paths traverse one switch at the DA output, which provides support for legacy modes and devices.

FIGS. 4, 5, 6, 7 and 8 depict combining the signals inside the transceiver, while FIGS. 9 and 10 make the signal combination inside the power amplifier.

Figure 11:
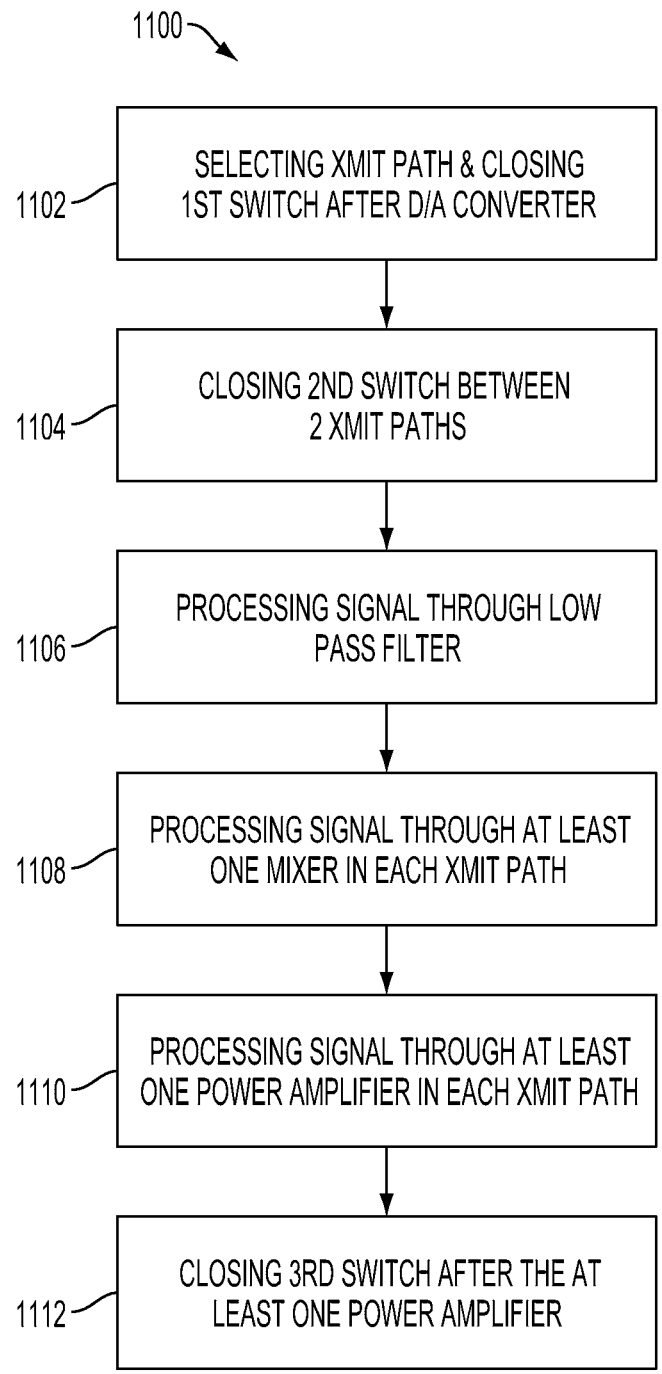
FIG. 11 is a flow diagram of a method of communicating over a transmit diversity architecture in accordance with an embodiment of the disclosure.

FIG. 11 provides a flow chart of a method of wireless communication using an apparatus providing transmit diversity with optimized power consumption. In step 102 the transmit path is selected and a first switch after a digital to analog converter is closed. In step 80411, a second switch is closed between the two transmit paths. The signal is then processed through the low-pass filter in step 1106. After the low-pass filter processing is complete, the signal is then processed through at least one mixer in the transmit path in step 1108. The signal is then processed through at least one driver amplifier in each transmit path in step 1110. After the driver amplifier amplifies the signal, a third switch is closed in step 1112 and the signal is ready to be transmitted.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for transmit diversity in a multiple input multiple output (MIMO) network, comprising:
   two input digital to analog converters, each accepting a data input;
   two transmit paths, each path comprising at least one low pass filter, at least one mixer, and at least one driver amplifier;
   a first switch connecting the two transmit paths before the driver amplifier;
   a second switch connecting the transmit paths after the driver amplifier; and further comprising a cross-switch composed of two switches installed in the transmit path of both transmit signals following the at least one driver amplifier and before a power amplifier in each transmit path.

2. An apparatus for transmit diversity in a multiple input multiple output (MIMO) network, comprising:
   two input digital to analog converters, each accepting a data input;
   two transmit paths, each path comprising at least one low pass filter, at least one mixer, and at least one driver amplifier;
   a first switch connecting the two transmit paths before the driver amplifier;
   a second switch connecting the transmit paths after the driver amplifier; and further comprising a cross-switch composed of two switches installed in the transmit path of both transmit signal following the at least one driver amplifier.

3. An apparatus for transmit diversity in a multiple input multiple output (MIMO) network, comprising:
   two input digital to analog converters, each accepting a data input;
   two transmit paths, each path comprising at least one low pass filter, at least one mixer, and at least one driver amplifier;
   a first switch connecting the two transmit paths before the driver amplifier wherein the first switch connects the two transmit paths before the two digital to analog converters; and
   a second switch connecting the transmit paths after the driver amplifier.

4. An apparatus for transmit diversity in a multiple input multiple output (MIMO) network, comprising:
   two input digital to analog converters, each accepting a data input;
   two transmit paths, each path comprising at least one low pass filter, at least one mixer, and at least one driver amplifier;
   a first switch connecting the two transmit paths before the driver amplifier, wherein the first switch connects the two transmit paths after the two digital to analog converters and before the at least one low pass filter;

a second switch connecting the transmit paths after the driver amplifier.

5. An apparatus for transmit diversity in a multiple input multiple output (MIMO) network, comprising:

two input digital to analog converters, each accepting a data input;

two transmit paths, each path comprising at least one low pass filter, at least one mixer, and at least one driver amplifier;

a first switch connecting the two transmit paths before the driver amplifier, wherein the first switch connects the two transmit paths after the at least one low pass filter and before the at least one mixer; and a second switch connecting the transmit paths after the driver amplifier.

6. A method for providing total power from one transmit path, comprising:

selecting a transmit path and closing a first switch after a digital to analog converter;

closing a second switch between the two transmit paths to provide for use of at least one low pass filter or mixer or driver amplifier in each transmit path; processing a signal through the at least one low pass filter or mixer or driver amplifier in each transmit path, wherein half of a total power is allocated to each transmission path; and closing a third switch after the at least one driver amplifier in each transmit path to force the half-power from one transmit path into one output.

7. The method of claim 6, wherein the third switch is a cross-switch between both transmit paths and one branch is closed.

8. An apparatus for providing total power from one transmit path, comprising:

means for selecting a transmit path and closing a first switch after a digital to analog converter;

means for closing a second switch between the two transmit paths to provide for use of at least one low pass filter or mixer or driver amplifier in each transmit path, wherein half of the total power is allocated to each transmission path; and means for closing a third switch after the at least one power amplifier in each transmit path to force the half-power from one transmit path into one output.

9. The apparatus of claim 8, wherein the third switch is a cross-switch installed in the transmit path of both transmission paths.

10. A non-transitory computer-readable medium having instructions stored thereon, which when executed by a processor, causes the following to occur:

selecting a transmit path and closing a first switch after a digital to analog converter;

closing a second switch between the between the two transmit paths to provide for use of at least one low pass filter in each transmit path;

processing the signal through the at least one low pass filter in each transmit path;

processing the signal through the at least one mixer in each transmit path;

processing the signal through the at least one power amplifier in each transmit path, wherein half of a total power is allocated to each transmission path; and closing a third switch after the at least one power amplifier in each transmit path to force the half-power from one transmit path into one output.

11. The non-transitory computer readable medium of claim 10, further comprising instructions for closing one branch of a cross switch that is the third switch.

\* \* \* \* \*